United States Patent
Wadia et al.

(10) Patent No.: US 6,195,983 B1
(45) Date of Patent: Mar. 6, 2001

(54) LEANED AND SWEPT FAN OUTLET GUIDE VANES

(75) Inventors: Aspi R. Wadia, Loveland; Peter N. Szucs, West Chester; Bruce A. Hemmelgarn, Loveland, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/248,894

(22) Filed: Feb. 12, 1999

(51) Int. Cl.$^7$ .................................................. F02K 3/02
(52) U.S. Cl. ................. 60/226.1; 416/223 R; 415/208.1
(58) Field of Search ................... 60/226.1, 262; 416/223 R; 415/208.1

(56) References Cited

U.S. PATENT DOCUMENTS

| | | | |
|---|---|---|---|
| 3,922,852 | * 12/1975 | Drabek | 60/226.1 |
| 3,986,794 | * 10/1976 | Korn | 60/226.1 X |
| 4,013,377 | * 3/1977 | Amos | 415/161 |
| 4,504,189 | 3/1985 | Lings . | |
| 4,682,935 | 7/1987 | Martin . | |
| 4,714,407 | 12/1987 | Cox et al. . | |
| 4,741,667 | 5/1988 | Price et al. . | |
| 4,826,400 | 5/1989 | Gregory . | |
| 5,088,892 | 2/1992 | Weingold et al. . | |
| 5,167,489 | 12/1992 | Wadia et al. . | |
| 5,642,985 | 7/1997 | Spear et al. . | |
| 5,725,354 | 3/1998 | Wadia et al. . | |
| 5,782,077 | * 7/1998 | Porte | 60/226.1 X |

OTHER PUBLICATIONS

"Potential Pressure Field by Stator / Downstream Strut Interaction", by H. Kodama & S. Nagano, Journal of Turbomachinery, Apr. 1989, vol. 111, pp. 197–203.

"Optimisation Of Bypass Fan Outlet Guide Vanes", by A.B. Parry, The American Society Of Mechanical Engineers, Presented at the International Gas Turbine and Aeroengine Congress & Exhibition, Jun. 10–13, 1996, pp. 1–8.

"Sensitivity Analysis and Optimum Design Method for Reduced Rotor–Stator–Strut Flow Interaction", by G. Cerri & W.F. O'Brien, Journal of Turbomachinery, Oct. 1989, vol. 111, pp. 401–203.

"The Use Of Circumferentially Nonuniform Stators To Attenuate LP Compressor Rotor–Stator–Strut Aerodynamic And Mechanical Interactions", by M.G. Jones, M.T. Barton and W.F. O'Brien, The American Society Of Mechanical Engineers, Presented at the International Gas Turbine and Aeroengine Congress & Exhibition, Jun. 10–13, 1996, pp. 1–8.

(List continued on next page.)

Primary Examiner—Timothy S. Thorpe
Assistant Examiner—David J. Torrente
(74) Attorney, Agent, or Firm—Andrew C. Hess; Rodney M. Young

(57) ABSTRACT

A gas turbine engine fan assembly has a plurality of axially swept fan exit guide vanes circumferentially disposed around an axially extending centerline, a plurality of fan frame struts having axially swept strut leading edges and circumferentially disposed around the centerline directly aft of the exit guide vanes, and an axially extending annular gap between the trailing edges of the fan exit guide vanes and the strut leading edges. Each of the fan exit guide vanes has pressure and suction sides, vane trailing edges, and is circumferentially leaned such that the pressure side facing radially inward. Preferably, the axially swept vane trailing edges and the axially swept strut leading edges generally conform to each other in shape. An annular splitter is radially disposed at a spanwise position to split airflow from the fan into fan bypass airflow and core engine airflow and includes a splitter leading edge preferably positioned aft of the strut leading edges.

16 Claims, 5 Drawing Sheets

OTHER PUBLICATIONS

"OGV Tailoring to Alleviate Pylon–OGV–Fan Interaction", by G.N. Shrinivas and M.B. Giles, The American Society Of Mechanical Engineers, Presented at the International Gas Turbine and Aeroengine Congress & Exposition, Jun. 5–8, 1995, pp. 1–9.

"The Use Of Cyclic Variations In Strut Stagger To Reduce Coupled Blade–Vane–Strut–Pylon Interaction And System Losses", by A.B. Parry and R.H. Bailey, The American Society Of Mechanical Engineers, Presented at the International Gas Turbine and Aeroengine Congress & Exhibition, Jun. 2–5, 1997, pp. 1–8.

"Concept And Design Of Stator Tailored To Shield A Fan From Pressure Disturbances Arising In The Downstream Fan Duct", by P.E. Rubbert and R.D. LaPrete, AIAA 10th Aeorspace Sciences Meeting, AIAA Paper No. 72–74, Jan. 17–19, 1972, pp. 1–8.

* cited by examiner

LEANED AND SWEPT FAN OUTLET GUIDE VANES

BACKGROUND OF THE INVENTION

The Government has rights to this invention pursuant to a contract by the United States Air Force.

FIELD OF THE INVENTION

The present invention relates generally to an aircraft gas turbine engine having fan bypass ducts, and more particularly, to exit guide vanes and frame struts and splitters for dividing the fan flow between core and bypass ducts.

DISCUSSION OF THE BACKGROUND ART

A gas turbine engine includes a core engine having, in serial axial flow relationship, a high pressure compressor to compress the airflow entering the core engine, a combustor in which a mixture of fuel and the compressed air is burned to generate a propulsive gas flow, and a high pressure turbine which is rotated by the propulsive gas flow and which is connected by a large diameter shaft to drive the high pressure compressor. A typical bypass turbofan engine adds a low pressure turbine aft of the high pressure turbine which drives a fan forward of the high pressure compressor. A splitter aft of the fan divides fan flow exiting the fan into core engine flow and bypass flow around the core engine. The splitter is mounted to struts of a forward engine frame, referred to as the fan frame, and separates a bypass duct inlet from a core engine duct inlet.

The fan frame struts and the splitter are placed at a sufficient distance from fan outlet guide vanes directly aft of fan blades of the fan such that there is enough length in an empty gap extending from an exit guide vane trailing edge to a strut leading edge such that the static pressure field from the struts do not locally back-pressure the exit guide vanes and cause non-uniform flows which create high pressure losses, reduced stall margin, or high airflow distortion transfer. It is highly desirable to minimize the length of gap without producing this undesired aerodynamic back-pressure which causes the loss of engine performance, aerodynamic instability of the fan and compressor, or adversely impacting the fan airflow distortion transfer to the compressor.

Prior art studies have suggested the use of non-axisymmetric stator or fan exit guide vane configurations ahead of pylons and/or struts to achieve a uniform flow field upstream of the stators. Two and three-dimensional potential flow analyses have been used to conceptually develop stators with varying degree of camber angles in the vicinity of the strut to protect the rotor from the pressure disturbance induced forward by the service strut. Experiments of O'Brien, Reimers and Richardson (1983) and Woodard and Balombin (1984) confirmed the importance of the potential flow interaction between rotor, stator and struts in the production of rotor blade pressure fluctuations. In 1996, Parry using a simpler calculation scheme arrived at results similar to those obtained by Rubbert showing the relative benefits of increasing the number of vane types to alleviate the exit guide vane and frame flow interaction. Shrinivas and Giles (1995) performed detailed sensitivity studies to arrive at a cyclically varying exit guide vane trailing edge camber configuration, while maintaining the leading edge airfoil shape, thus retaining uniform exit guide vane incidence angle. These, and other prior art studies, are disclosed in the prior art publications cited herein. These types of stator camber modifications described above, while technically very effective, are usually unattractive from a manufacturing cost and maintenance perspective.

As a practical alternative to building stator cascades with different camber angles, a slightly more attractive option that lowers the cost of implementation uses circumferentially re-staggered stator vanes in front of the struts to channel the exit flow from the stator trailing edge smoothly around the strut leading edge. Yokoi, Nagano and Kakehi (1981) tested several such stator re-stagger options showing large reductions in upstream pressure disturbance. Cerri and O'Brien (1989) used the classical Douglas-Neumann singularity superposition method to solve the cascade-strut system to arrive at an optimal staggering of the stator configuration that predicted the lowest upstream pressure disturbance. Jones, Barton and O'Brien (1996) used the Douglas-Neumann formulation of Cerri and O'Brien to design and test exit guide vanes with circumferentially non-uniform stator stagger angle distribution and showed reduced static pressure disturbance on the rotor. Studies have also been directed at reducing the flow interactions to improve fan acoustic levels are described by McArdle, Jones, Heidelberg and Homyak (1980), Ho (1981), Nakamura, Isomura and Kodama (1986) and Preisser, Schoenster, Golub and Home (1981). These engine configurations are still relatively unattractive from a manufacturing cost and maintenance perspective. It is highly desirable that all the exit guide vanes have the same shape, size and stagger angle.

SUMMARY OF THE INVENTION

A gas turbine engine fan assembly has a plurality of axially swept fan exit guide vanes circumferentially disposed around an axially extending centerline, a plurality of fan frame struts having axially swept strut leading edges and circumferentially disposed around the centerline directly aft of the exit guide vanes, and an axially extending annular gap between the trailing edges of the fan exit guide vanes and the strut leading edges. Each of the fan exit guide vanes has pressure and suction sides, vane trailing edges, and is circumferentially leaned such that the pressure side facing radially inward. Preferably, the axially swept vane trailing edges and the axially swept strut leading edges generally conform to each other in shape. An annular splitter is radially disposed at a spanwise position to split airflow from the fan into fan bypass airflow and core engine airflow and includes a splitter leading edge preferably positioned aft of the strut leading edges.

Various embodiments include the swept strut leading and swept vane trailing edge having sweeps chosen from a plurality of sweeps in a radially outer direction, the plurality consisting of forward, aft, aft inner and forward outer, and forward inner and aft outer sweeps.

In one particular embodiment of the invention, the vanes are circumferentially curved having stacking lines that curve in a first circumferential in a first radial portion of the vane and curve in a second circumferential direction in a second radial portion of the vane. In one particular embodiment of the invention, a circumferential lean of the vane is concentrated around a pitch line of the vanes between the first and second radial portions of the vane. A yet more particular embodiment of the invention provides that the stacking lines are substantially linear around the pitch lines between the first and second radial portions of the vanes.

ADVANTAGES OF THE INVENTION

The present invention allows leading edges of fan struts to be positioned closer to fan exit guide vanes with a smaller empty gap therebetween. It allows such a configuration without having tailored flow near the struts by using different tailored airfoils or stagger angles for the fan exit guide vanes. The invention, therefore, offers aircraft gas turbine engine designers the advantage of designing shorter and less complex engines that have reduced cost and maintenance fees than would otherwise be possible. The present invention provides an aerodynamically closely coupled swept and leaned exit guide vane and frame strut and splitter system. The invention allows aircraft gas turbine engine designers to minimize the length of gap without producing an undesired aerodynamic back-pressure, loss of engine performance, aerodynamic instability of the fan and compressor, or adversely impacting the fan airflow distortion transfer to the compressor.

One benefit of the circumferential lean in the exit guide vanes is lowering the exit guide vane hub exit Mach number, thus, reducing the required duct velocity diffusion ratio. The lean is such to custom tailor the flow radially inwards in to the hub endwall. Combining the lean with sweeping aft of the airfoil is done to move the trailing edge meridional projection at midspan further aft relative to the exit guide vane hub trailing edge which helps prolong the benefit due to lean (lowering the inner wall Mach number) further downstream from the exit guide vane hub trailing edge and thereby providing better control of the core duct hub diffusion.

The improved flow uniformity achieved by the swept and leaned fan exit guide vanes of the present invention eliminates the need for using either several vane types with different camber levels or re-staggering the vanes to construct a shorter engine by reducing the axial gap between the outer guide vanes and the struts, thus providing considerable cost and maintainability benefits to the engine system by having all uniformly sized and shaped exit guide vanes.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
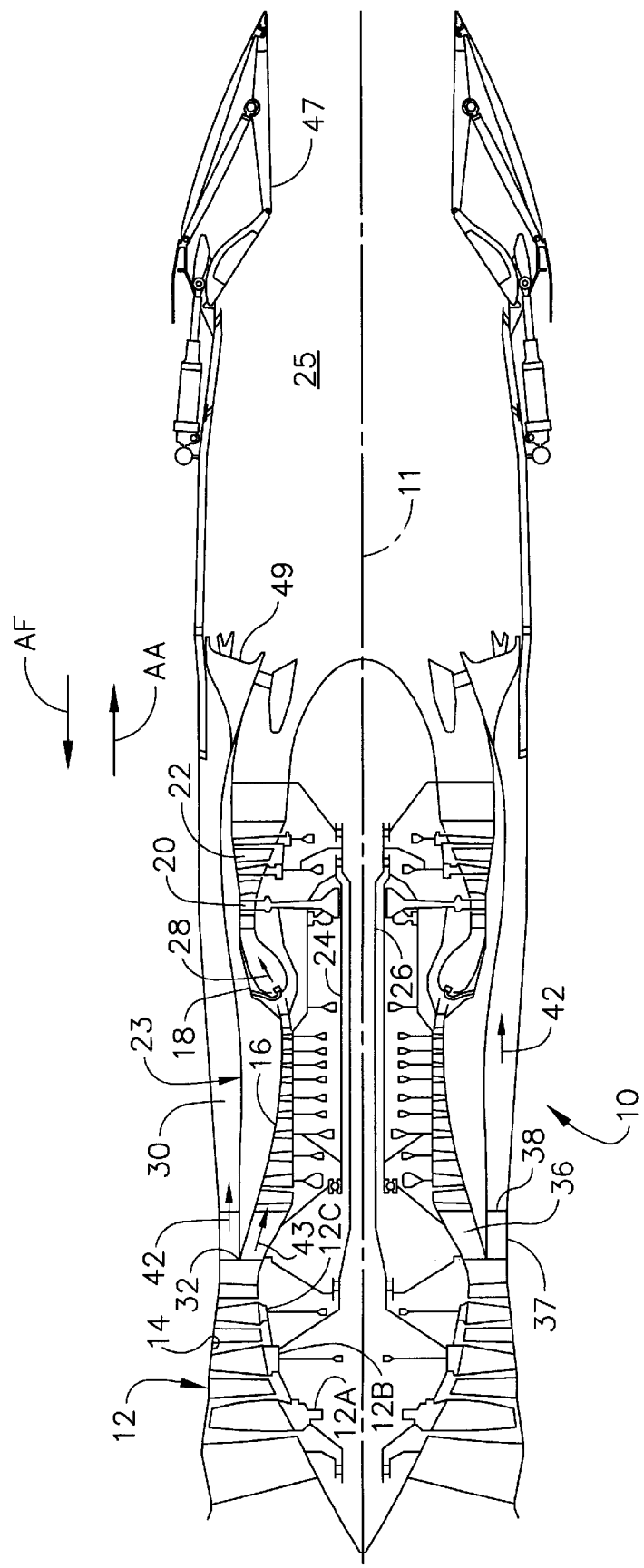
FIG. 1 is a cross-sectional illustrative view of an exemplary aircraft gas turbine engine in accordance with the prior art.

Illustrated in FIG. 1 is a schematic representation of a prior art aircraft gas turbine engine 10 in accordance with one embodiment of the present invention. The gas turbine engine 10 is circumferentially disposed about an engine centerline 11 and has, in serial flow relationship, a fan section 12, a high pressure compressor 16, a combustion section 18, a high pressure turbine 20, and a low pressure turbine 22. The fan section 12 is illustrated as a multi-stage fan section having first, second, and third stage fan blades 12A, 12B, and 12C, respectively, disposed within an annular fan duct 14. The high pressure compressor 16, the combustion section 18 and high pressure turbine 20 are often referred to as a core engine 23. A high pressure rotor shaft 24 connects, in driving relationship, the high pressure turbine 20 to the high pressure compressor 16 and a low pressure rotor shaft 26 drivingly connects the low pressure turbine 22 to the fan section 12. Fuel is burned in the combustion section 18 producing a very hot gas flow 28 which is directed through the high pressure and low pressure turbines 20 and 22, respectively, to power the engine 10.

Figures 2A, 2B:
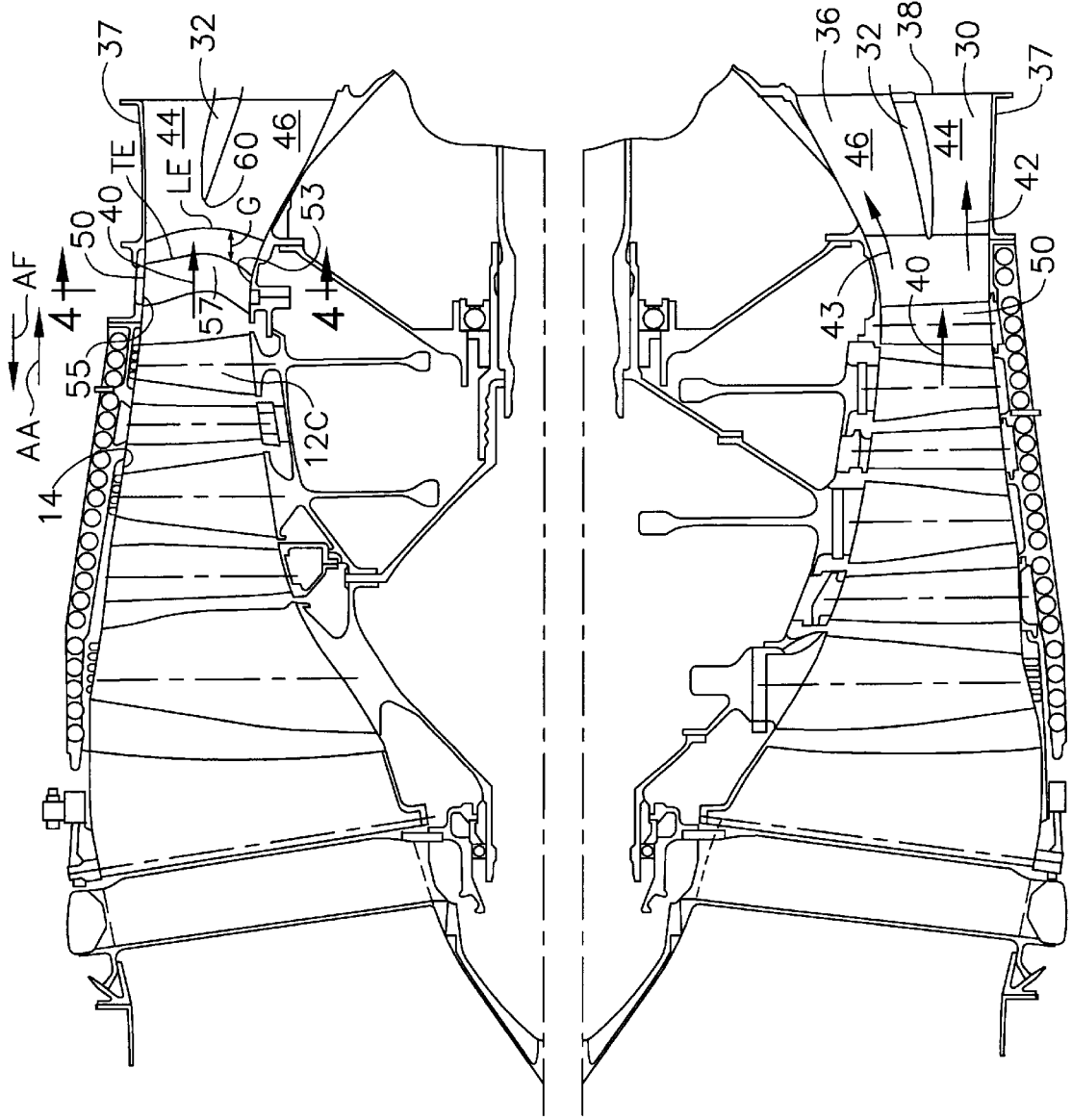
FIG. 2A is an enlarged cross-sectional illustrative view of fan exit guide vanes, struts, and splitter of the exemplary first embodiment of the present invention in FIG. 2.
Figure 2C:
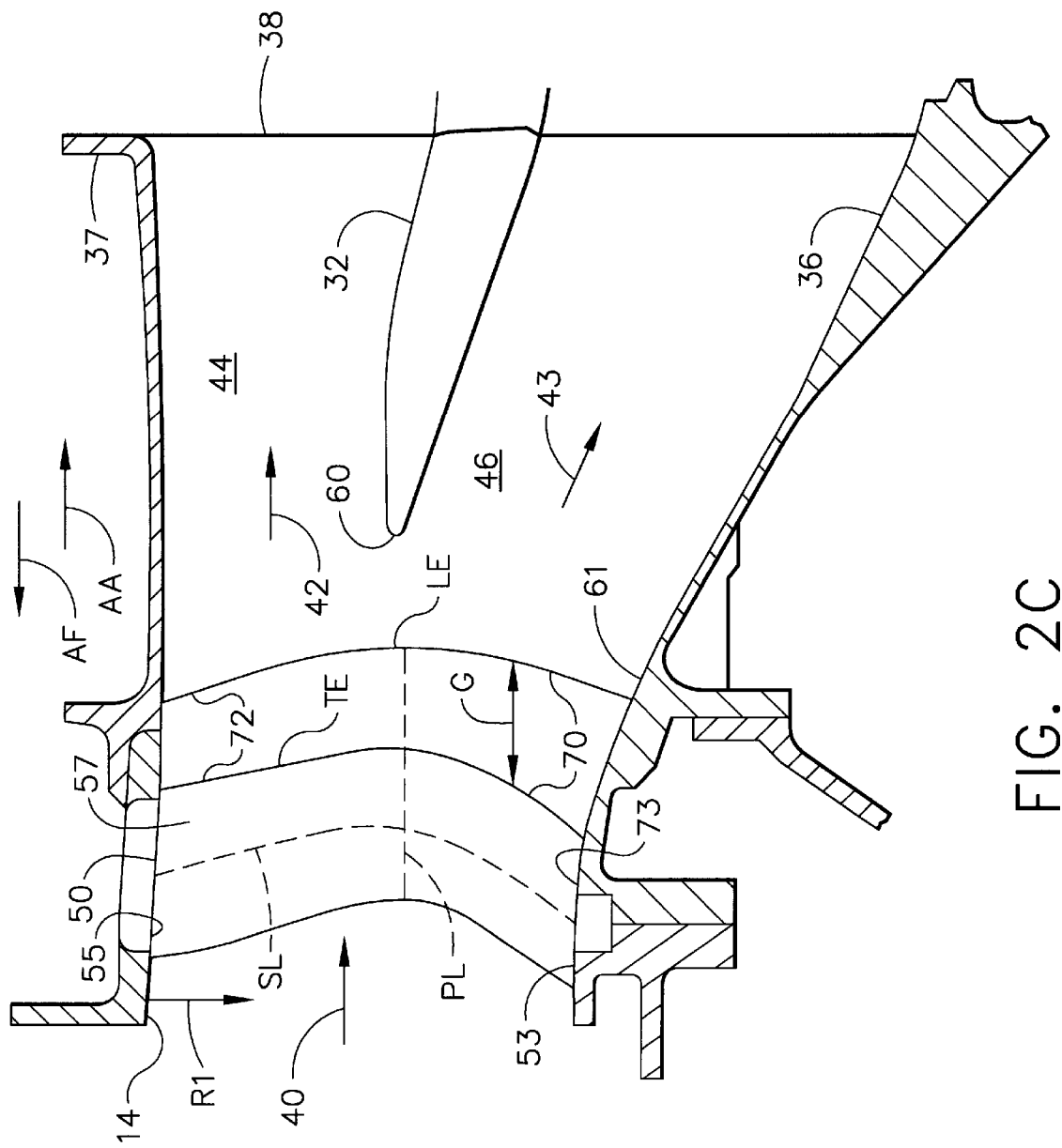
FIG. 2 is a cross-sectional illustrative view of a forward portion of an aircraft gas turbine engine in accordance with a exemplary first embodiment of the present invention as compared to the forward portion of aircraft gas turbine engine in FIG. 1.

FIG. 2 illustrates the fan section 12 of engine 10 with the present invention in a top half A of FIG. 2 as compared to the conventional version of fan section 12 in a bottom half B of FIG. 2. Referring to the bottom half B, fan air 40 exits the fan section 12 through a plurality of fan exit guide vanes 50 which are circumferentially disposed around the centerline 11 directly aft of the third stage fan blade 12C. An annular splitter 32 splits the fan air 40 exiting the fan exit guide vanes 50 into a bypass air portion 42 bypassed around the core engine 23 through a bypass duct 30 and into a core engine air portion 43 passed through a diffusion duct 36 into the core engine. At the aft end of the fan section 12 is a fan frame 37 including a circumferentially disposed plurality of structural struts 38. The struts 38 extend radially across a fan bypass inlet 44 of the bypass duct 30 and a core engine inlet 46 of diffusion duct 36. The splitter 32 is sectioned and attached to the struts 38 and splitter 32 extends axially between the fan bypass inlet 44 and the core engine inlet 46. The fan exit guide vanes 50 are conventional and unswept as are the struts 38.

Referring more specifically to FIG. 1, the hot gas flow 28 is discharged into an exhaust section 25 of the engine 10 where it is mixed with the bypass air portion 42 from the bypass duct 30 and exhausted through a variable nozzle 47 at the aft end of the engine 10. An afterburner 49 may be used for thrust augmentation. The exemplary engine 10 illustrated in FIG. 1 is typical of a military gas turbine aircraft engine such as the General Electric F-110. This engine has 6 struts and 96 fan exit guide vanes.

Figure 3:
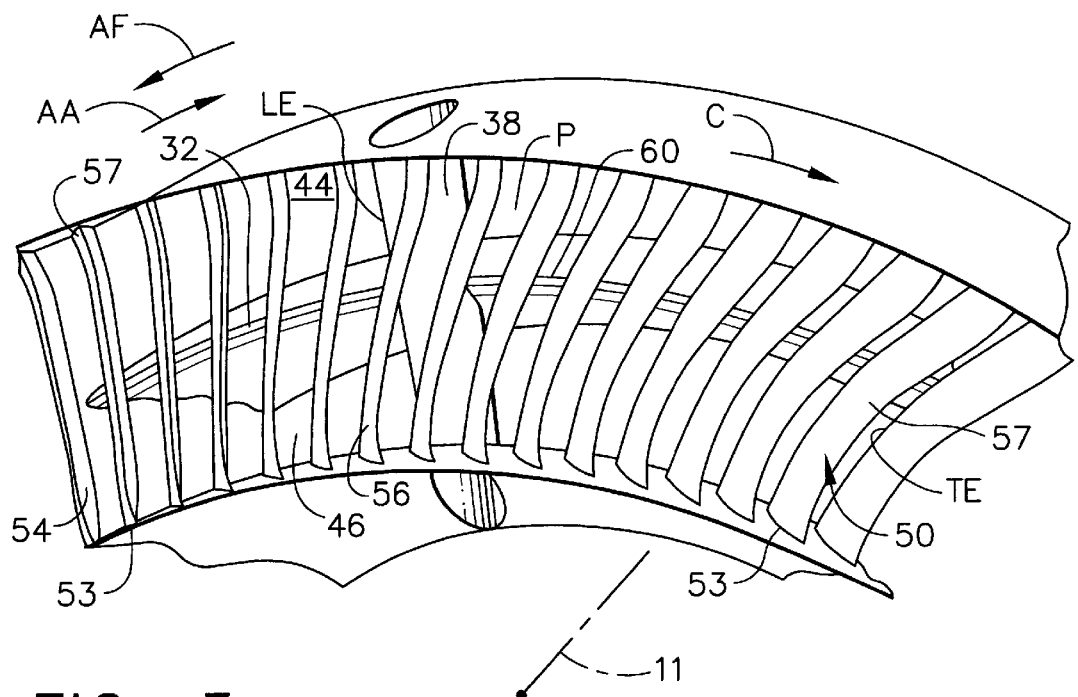
FIG. 3 is a perspective view illustration of a circumferentially extending portion of the fan exit guide vanes, struts, and splitter of the exemplary first embodiment of the present invention in the forward portion of aircraft gas turbine engine in FIG. 1.

In the present invention, as illustrated in the top half A of FIGS. 2, 2A, and in FIG. 3, the fan exit guide vanes 50 are axially swept having axially swept vane trailing edges TE and the struts 38 have strut leading edges LE that are axially swept to generally conform in shape to the axially swept trailing edges TE. The strut leading edges LE are closely spaced apart from the vane trailing edges TE with a small axially extending annular gap G between them. A forward swept vane embodiment of the fan exit guide vanes 50 has airfoil portions which extend axially forwardly AF as it extends radially outwardly from a root 53 to a tip 55 of an airfoil 57 of the fan exit guide vane 50 and conversely an aft swept vane has airfoil portions which extend axially aftwardly AA as it extends radially outwardly from the root to tip. Similarly, forward swept edges and aftward swept edges have edges which extend axially forwardly and axially aftwardly respectively as they extend radially outwardly from the root to tip of the airfoil. Conventional unswept airfoils extend radially outwardly without forward or aftward extension. Aerodynamic forward sweep is discussed in U.S. Pat. No. 5,167,489 to Wadia et al.

The axially swept vane trailing edges TE and the axially swept strut leading edges LE have an aft inner and forward outer sweep in which radially inner edge portions 70 of these leading and trailing edges are swept aftwardly and radially outer edge portions 72 of these leading and trailing edges are swept forwardly. The change from aftwardly to forwardly is preferably located at a radial distance from the centerline 11 corresponding to a radial location of a splitter leading edge 60 of the annular splitter 32. Preferably the splitter leading edge 60 is axially positioned aft of the strut leading edges. These leading and trailing edges are axially swept to generally conform in shape to each other.

Figure 4:
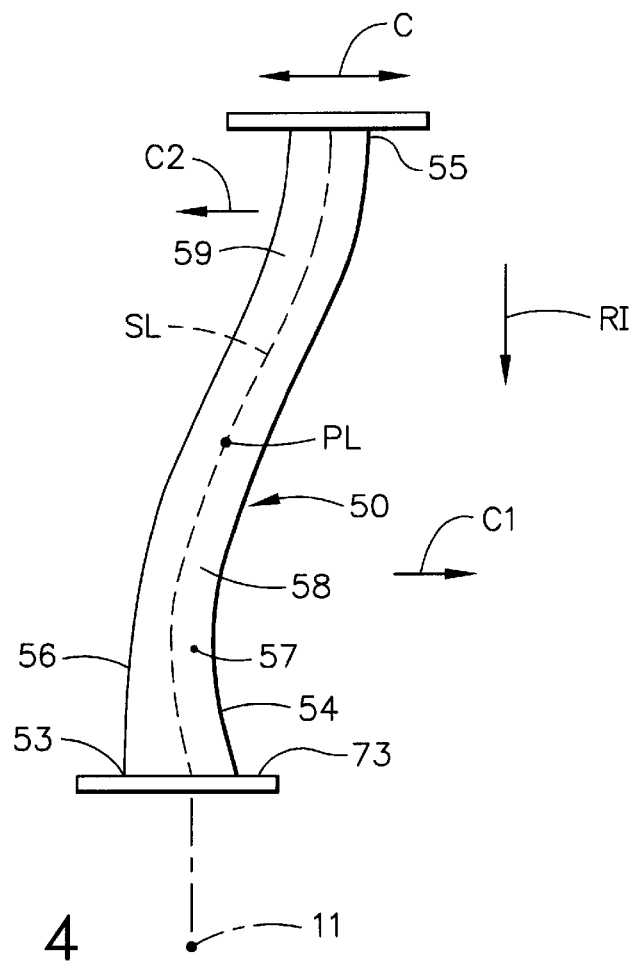
FIG. 4 is an aft facing cross-sectional schematic illustration of one of the guide vanes in FIG. 3 taken through line 4—4 in FIG. 3.

Referring further to FIG. 4, each of the fan exit guide vanes 50 has pressure and suction sides 54 and 56, respectively, and are leaned in a circumferential direction C such that the pressure side 54 facing radially inward RI towards the centerline 11. The fan exit guide vanes 50 are circumferentially leaned such that stacking lines SL of the vanes curve in a first circumferential direction C1 in a first radial portion 58 of the vane and curve in a second circumferential direction C2 in a second radial portion 59 of the vane. Preferably, the fan exit guide vanes 50 circumferentially have a lean indicated by the circumferentially extending shape of the stacking lines SL that is concentrated around a pitch line PL of the vanes between the first and second radial portions 58 and 59, respectively, of the vane. The stacking lines SL are preferably substantially linear around the pitch lines PL.

The axially swept and circumferentially leaned fan exit guide vanes 50 reduce the amount of diffusion in the diffusion duct 36 along a radially inner duct wall 61 which recedes towards the centerline 11 in the axially aftwardly AA direction. It also is responsible for reducing the potential flow interaction between the stators and the struts relative to that produced by conventional radial fan exit guide vanes. The circumferential lean of the fan exit guide vanes 50 lowers the exit Mach number at the root 53 of the vanes thus reducing the required duct velocity diffusion ratio. The amount of lean is such to tailor the flow radially inwards in towards the root 53 and an endwall 73 of the fan exit guide vanes 50.

The combination of the lean with axially aft sweep of vane airfoil 57 moves a meridional projection of the trailing edge TE at midspan of the airfoil (about where the pitch line PL is) further aft relative to the axial position of the trailing edge at the root 53. This helps prolong the benefit due to lean (lowering the inner wall Mach number) further downstream from the trailing edge at the root 53 and thereby providing better control of the diffusion along the inner duct wall 61 of the diffusion duct 36 particularly by preventing separation of the core flow 43 along the inner duct wall.

Referring more particularly to FIG. 3, the lean of the exit guide vanes 50 causes more than one exit guide vane to circumferentially cross in front of each of the strut leading edges LE. The spread of these crossings to several exit guide vane passages P between the exit guide vanes 50 it limits the effect of aerodynamic coupling between each passage and nearby strut 38 to small localized areas along each of the effected exit guide vanes 50 and to small radial lengths of the struts. This results in a diffused upstream propagation of the strut leading edge static pressure field relative to that with conventional radial exit guide vanes. This is so as the three-dimensional nature of the exit guide vanes design helps the air flow to redistribute in both the radial and tangential directions to alleviate the back-pressure from the downstream strut.

Figure 5:
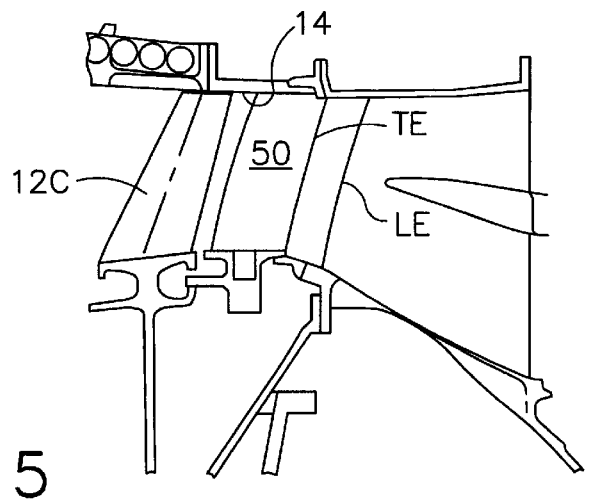
FIG. 5 is a cross-sectional illustrative view of an assembly of a fan blade, fan exit guide vane and strut of an exemplary aircraft gas turbine engine in accordance with a second embodiment of the present invention.
Figure 6:
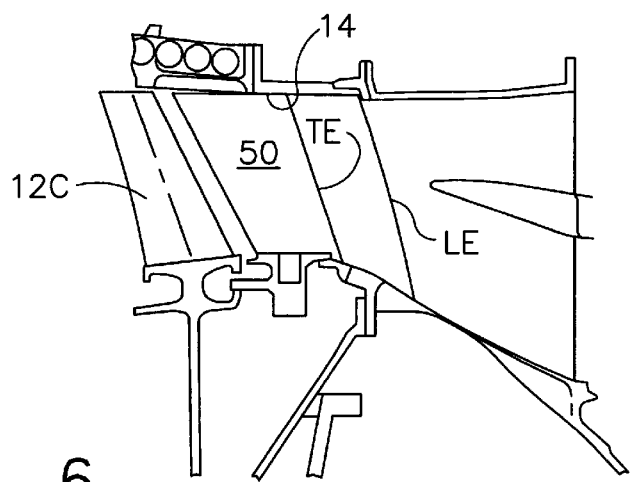
FIG. 6 is a cross-sectional illustrative view of an assembly of a fan blade, fan exit guide vane and strut of an exemplary aircraft gas turbine engine in accordance with a third embodiment of the present invention.
Figure 7:
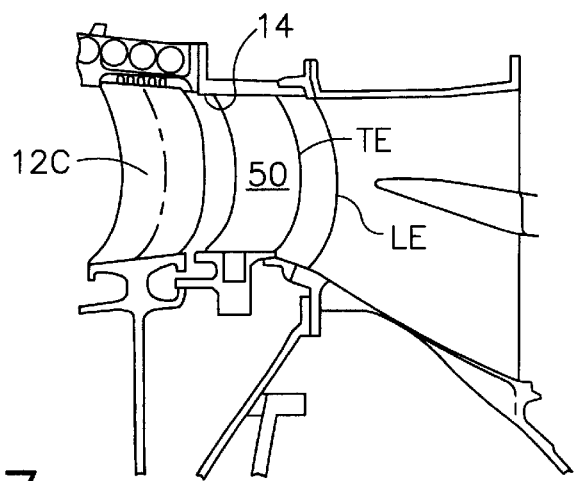
FIG. 7 is a cross-sectional illustrative view of an assembly of a fan blade, fan exit guide vane and strut of an exemplary aircraft gas turbine engine in accordance with a fourth embodiment of the present invention.

FIGS. 5, 6, and 7 illustrate second, third, and fourth embodiments of the shape or sweep of the axially swept vane trailing edges and strut leading edges. FIG. 5 illustrates an the axially aft swept version of the third stage fan blades 12C, the fan exit guide vanes 50, the vane trailing edges TE, and the strut leading edges LE. FIG. 6 illustrates an the axially forward swept version of the third stage fan blades 12C, the fan exit guide vanes 50, the vane trailing edges TE, and the strut leading edges LE. FIG. 7 illustrates an the axially curved swept version of the third stage fan blades 12C, the fan exit guide vanes 50, the vane trailing edges TE, and the strut leading edges LE, in which these elements are bowed in the axially aftwards direction.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A gas turbine engine fan assembly comprising:
    a plurality of axially swept fan exit guide vanes having swept trailing edges circumferentially disposed around an axially extending centerline,
    a plurality of fan frame struts having strut leading edges and circumferentially disposed around an the centerline directly aft of said exit guide vanes and an axially extending annular gap between said trailing edges of said fan exit guide vanes and said strut leading edges, and
    said fan exit guide vanes having pressure and suction sides and being circumferentially leaned such that said pressure sides faces radially inward.

2. An assembly as claimed in claim 1 wherein said strut leading edges generally conform in sweep to said vane trailing edges.

3. An assembly as claimed in claim 2 further comprising an annular fan airflow splitter radially disposed at a spanwise position betweeen a fan bypass inlet and a core engine inlet.

4. An assembly as claimed in claim 3 further comprising a splitter leading edge on said splitter and positioned aft of said strut leading edges.

5. An assembly as claimed in claim 4 wherein said leading and trailing edge sweeps are chosen from a plurality of sweeps in a radially outer direction, said plurality consisting of forward, aft, aft inner and forward outer, and forward inner and aft outer.

6. An assembly as claimed in claim 5 wherein said vanes are circumferentially curved and have stacking lines that curve in a first circumferential direction in a first radial portion of said vane and curve in a second circumferential direction in a second radial portion of said vane.

7. An assembly as claimed in claim 6 wherein a circumferential lean is concentrated around a pitch line of said vanes between said first and second radial portions of said vane.

8. An assembly as claimed in claim 7 wherein said stacking lines are substantially linear around said pitch line between said first and second radial portions of said vane.

9. A gas turbine engine assembly comprising:

an annular fan duct circumscribed about a centerline, an annular core engine inlet disposed axially aft of said fan duct, an annular fan bypass inlet disposed axially aft of said fan duct and radially outward of said core engine inlet, an annular splitter disposed radially between said fan bypass inlet and said core engine inlet, a plurality of axially swept fan exit guide vanes having axially swept vane trailing edges and circumferentially disposed around said centerline and within said fan duct with only an axially extending gap between said fan exit guide vanes and strut leading edges of said struts, a plurality of struts having axially swept strut leading edges, circumferentially disposed around said centerline, and disposed radially across said fan bypass inlet and said core engine inlet, said fan exit guide vanes comprising axially swept vane airfoils having pressure and suction sides, radially spanning outward across said fan duct from vane airfoil roots to vane airfoil tips, and extending axially aft from vane leading edges to said vane trailing edges, and said vane airfoils having a circumferential lean such that said pressure sides face radially inward.

10. An assembly as claimed in claim 9 wherein said strut leading edges generally conform in shape to said vane trailing edges.

11. An assembly as claimed in claim 10 further comprising an annular splitter radially disposed at a spanwise position to split airflow from the fan into fan bypass airflow and core engine airflow.

12. An assembly as claimed in claim 1 further comprising a splitter leading edge on said splitter and positioned aft of said strut leading edges.

13. An assembly as claimed in claim 12 wherein said leading and trailing edge sweeps are chosen from a plurality of sweeps in a radially outer direction, said plurality consisting of forward, aft, aft inner and forward outer, and forward inner and aft outer.

14. An assembly as claimed in claim 13 wherein said vanes are circumferentially curved and have stacking lines that curve in a first circumferential in first radial portions of said vanes and curve in a second circumferential direction in second radial portions of said vane.

15. An assembly as claimed in claim 14 wherein said circumferential lean is concentrated around pitch lines of said vanes between said first and second radial portions of said vane.

16. An assembly as claimed in claim 15 wherein said stacking lines are substantially linear around said pitch lines between said first and second radial portions of said vanes.

* * * * *